United States Patent [19]
Carli

[11] 3,819,227
[45] June 25, 1974

[54] MOTOR VEHICLE WITH SUNSHINE ROOF
[75] Inventor: Renzo Carli, Turin, Italy
[73] Assignee: Carrozzeria Pininfarina S.p.A, Turin, Italy
[22] Filed: June 18, 1973
[21] Appl. No.: 371,021

[30] Foreign Application Priority Data
Aug. 24, 1972 Italy .................................. 69720/72

[52] U.S. Cl............................................ 296/137 D
[51] Int. Cl............................................ B60j 7/00
[58] Field of Search ........ 296/137 D, 137 C, 137 B, 296/98; 160/328, 327

[56] References Cited
UNITED STATES PATENTS
1,860,463  5/1932  Kaplan et al.................... 296/137 D
2,632,507  3/1953  Ewing................................ 160/328
3,526,427  9/1970  Trenkler et al.................. 160/328 X FOREIGN PATENTS OR APPLICATIONS
65,908  2/1941  Norway........................... 296/137 D Primary Examiner—Allen N. Knowles
Attorney, Agent, or Firm—Sughrue, Rothwell, Mion, Zinn & Macpeak

[57] ABSTRACT

A motor vehicle sunshine roof of the flexible type is tensioned between a front cross member of the vehicle body and a rear roll bar by two levers pivotally attached to the sides of the roof opening. When the roof is opened the flexible roof portion is rolled up and accommodated in a receptacle formed in the roll bar.

8 Claims, 9 Drawing Figures

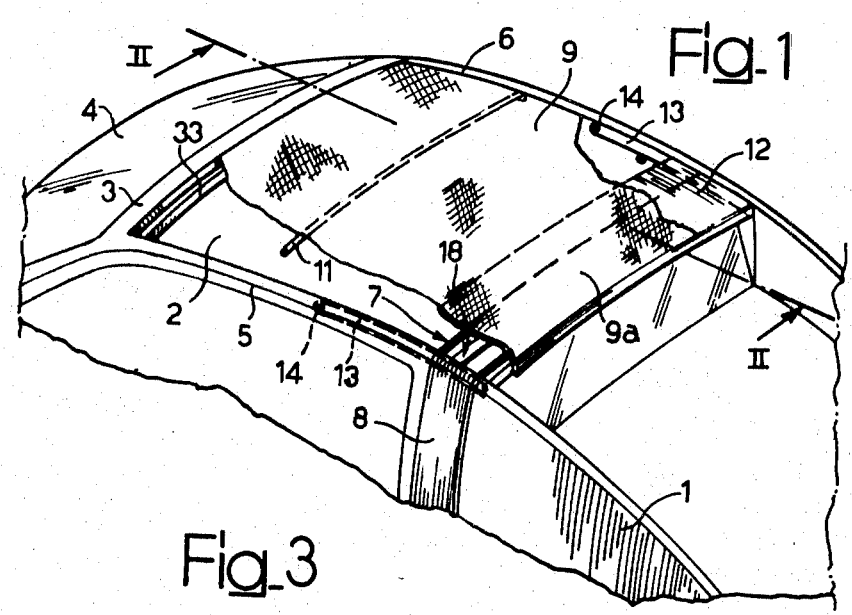
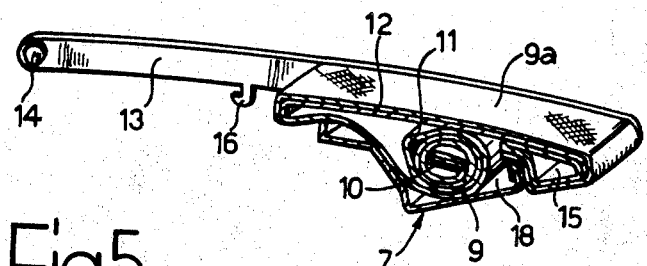
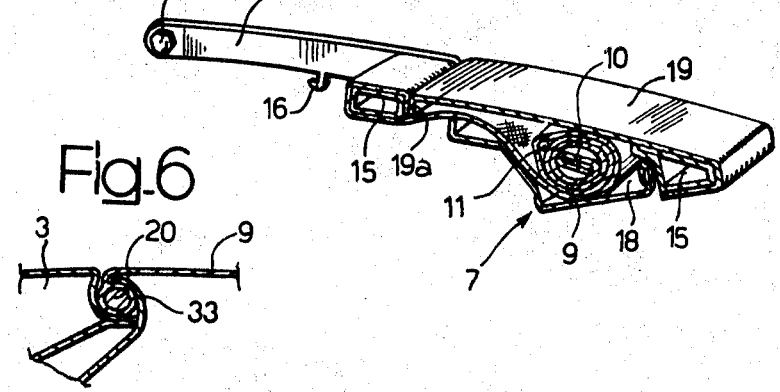

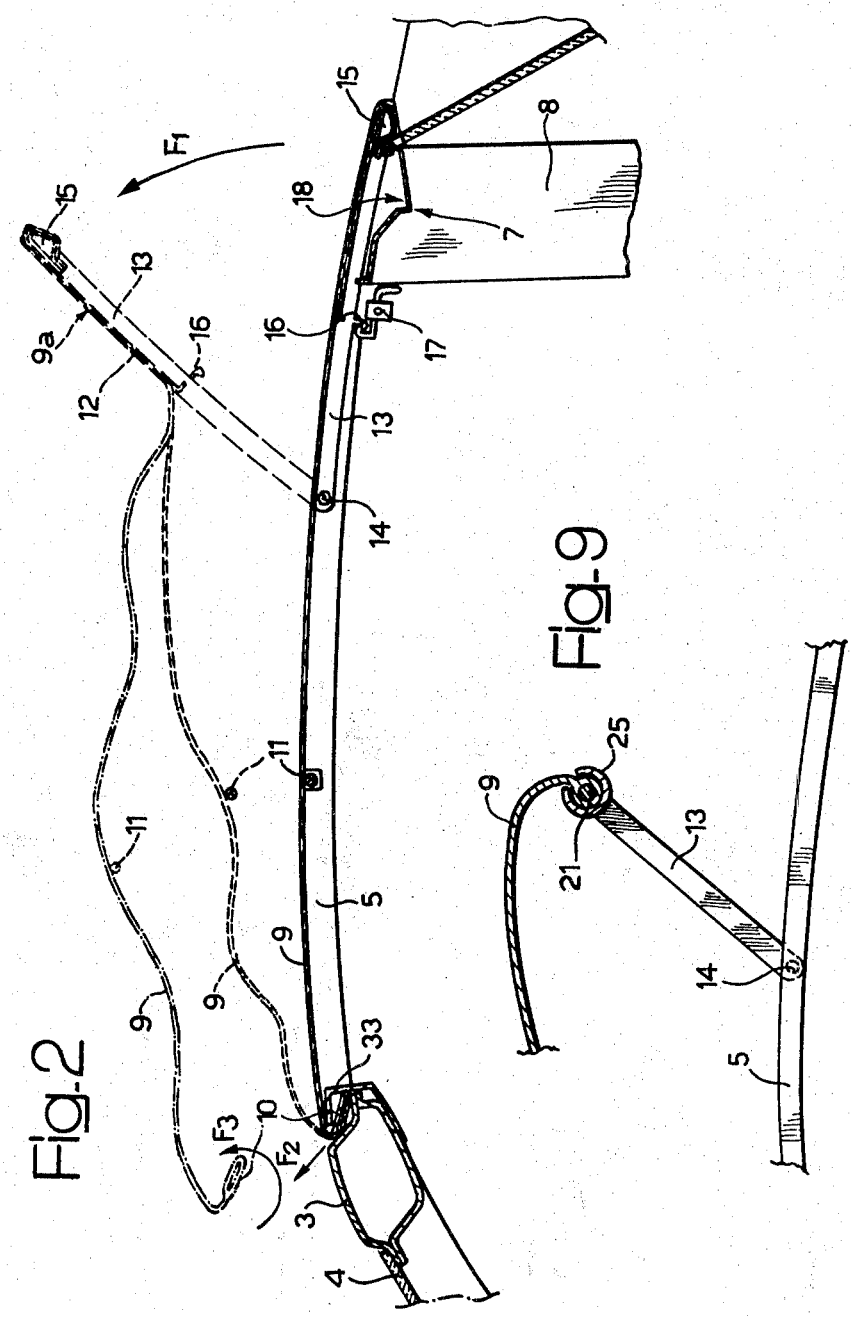

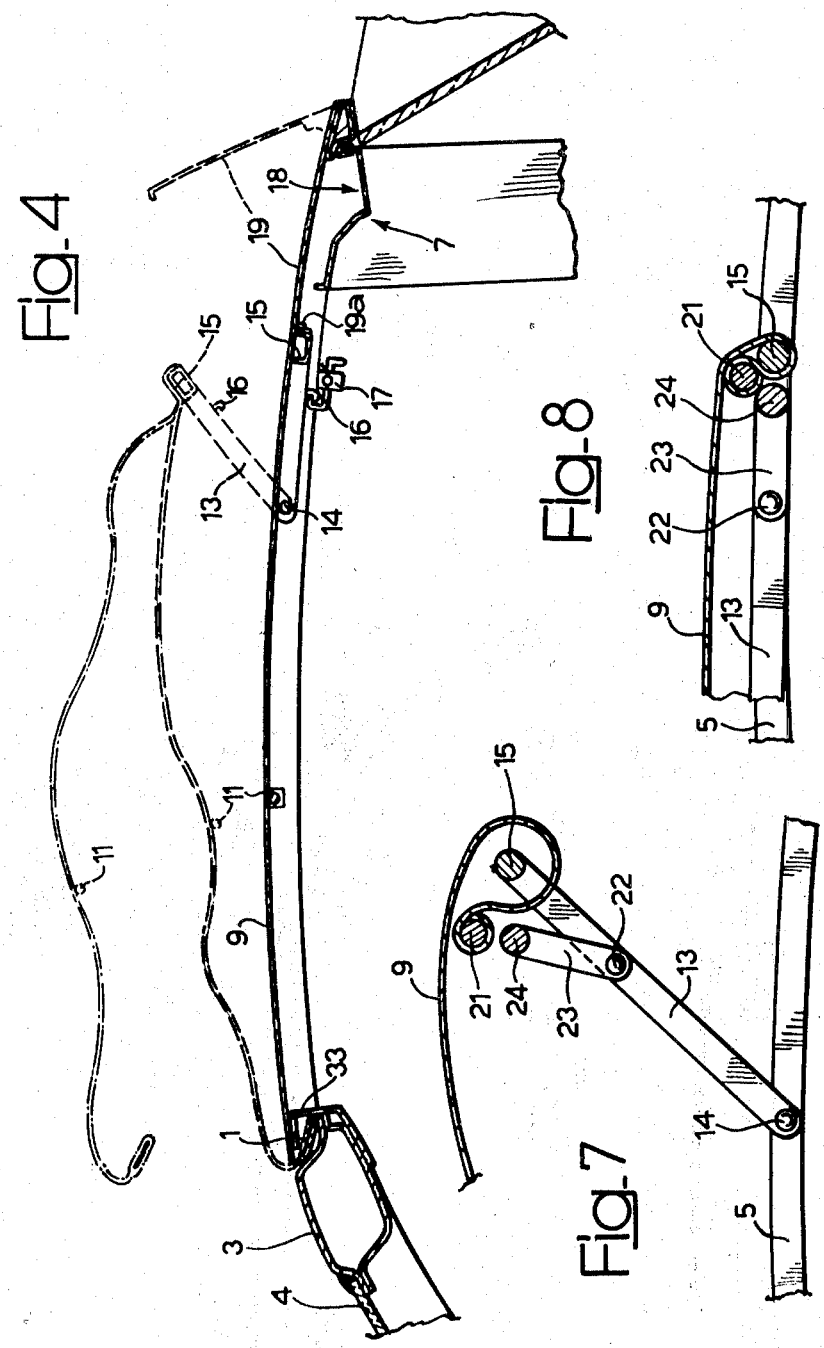

3,819,227

MOTOR VEHICLE WITH SUNSHINE ROOF

BACKGROUND OF THE INVENTION

It is known to provide a motor vehicle with a sunshine roof in which a flexible roof portion cooperates with a roof opening and has at its front edge means for attachment to a cross member of the vehicle coachwork above the windscreen, the said roof portion being connected at its rear edge to stretching means carried by the coachwork and adapted to tension the roof portion when the latter closes the roof opening.

An object of the present invention is to provide a simple and efficient device for putting a flexible roof portion under tension so as to allow the solution, in a simple and compact manner, of the problem of housing the flexible roof portion within the coachwork of the vehicle when the roof portion is folded back to open the roof of the vehicle.

SUMMARY OF THE INVENTION

According to the invention there is provided a motor vehicle with a sunshine roof as hereinabove defined, wherein:
  a. the roof opening with which said flexible roof portion cooperates is defined at the rear by a transverse portion of a roll bar forming part of the coachwork and laterally by two longitudinal stringers of the coachwork which interconnect said cross member and the ends of said transverse portion of the roll bar,
  b. the stretching means comprise two stretcher levers articulated to respective said stringers and a crosspiece interconnecting the free ends of said stretcher levers, said rear edge of the flexible roof portion being connectible to said crosspiece, and
  c. said transverse portionn of the roll bar is formed with a cupped receptacle adapted to hold the flexible roof portion when the latter has been disengaged from the said cross member and rolled up.

A movable cover may be provided for closing the cupped receptacle. In one embodiment of the invention the said movable cover comprises of a transverse panel interconnecting the free ends of the two stretcher levers. Alternatively, the movable cover may be articulated to the rear edge of the transverse portion of the roll bar.

BRIEF DESCRIPTION OF THE DRAWINGS

The invention will now be further described, by way of non-limiting example, with reference to the accompanying diagrammatic drawings, in which:

FIG. 1 is a partial perspective view, partly cut away, of the upper portion of a motor vehicle provided with a sunshine roof according to one embodiment of the invention;

FIG. 2 is a longitudinal section, on a larger scale, taken along the line II—II of FIG. 1, during the opening and closing of the sunshine roof;

FIG. 3 is a detail in longitudinal section illustrating the housing of the flexible roof portion when rolled up, that is, when the vehicle roof is open;

FIG. 4 is a longitudinal section similar to that in FIG. 2, illustrating a variant of the said embodiment of the invention;

FIG. 5 illustrates the housing in the motor vehicle of the flexible roof portion when rolled up, according to the variant of FIG. 4;

FIG. 6 is a detail, in section, illustrating the connection of the front edge of the flexible roof portion to the vehicle coachwork in one embodiment of the invention;

FIGS. 7 and 8 illustrate, in two different operating positions, the connection of the rear edge of the flexible roof portion to the stretching means employed in another embodiment of the invention, and FIG. 9 illustrates, in section, another variant of the connection between the rear edge of the flexible roof portion and the stretching means, for use with the present invention.

DETAILED DESCRIPTION OF THE ILLUSTRATED EMBODIMENTS

In the example illustrated in FIGS. 1 to 3, reference numeral 1 indicates part of the coachwork of a motor vehicle having sunshine roof including a foldable roof portion of flexible material.

The roof has a rectangular opening 2 which can be exposed or covered by the foldable roof portion. The opening 2 is defined at its front edge by a cross member 3 above the vehicle windscreen 4, the sides of the opening 2 being formed by two upper stringers 5, 6 of the coachwork above the side windows, and the rear edge of the opening being formed by a transverse portion 7 of a safety arch or roll bar 8 which is part of the vehicle coachwork.

The flexible roof portion is indicated by reference numeral 9 and is provided at its front edge with a rigid reinforcing strip 10 (FIG. 2) adapted to engage in a channel 33 carried by the front cross member 3. A slightly arched transversely extending reinforcing element 11 is affixed at an intermediate position to the lower surface of the flexible roof portion 9. The rear end section of the flexible roof portion 9, marked 9a, is affixed, for example by means of adhesive, to a transverse panel 12 which interconnects the ends of two stretcher levers 13 pivotally attached by respective hinge pins 14 to the respective stringers 5, 6 on opposite sides of the coachwork. The free ends of the levers 13 are connected to a crosspiece 15.

Each stretcher lever 13 is provided with a downwardly projecting catch element 16 adapted to engage a locking device 17 carried by the respective stringer 5, 6 when the lever 13 is in the lowered position shown by continuous lines in FIG. 2. Each locking device 17 is of a known type designed to engage automatically the corresponding catch element 16 when the respective lever 13 is fully lowered, the locking device being disengageable by a hand control to release the catch elements 16 and allow the levers 13 to be raised.

The transverse portion 7 of the roll bar 8 is shaped in the form of a shallow cupped receptacle, as shown at 18 in FIG. 2.

The device described with reference to FIGS. 1 to 3 functions as follows:

To open the roof from the closed position illustrated by continuous lines in FIG. 2 the stretcher levers 13 are first released by manually disengaging the locking devices 17. The levers 13 are then lifted in the direction of the arrow $F_1$ in FIG. 2, carrying the flexible roof portion 9 into the position shown by dashed lines in FIG. 2. The front edge of the flexible roof portion 9 is then disengaged from the channel section 33 by movement in the direction of arrow F₂, this disengagement being made possible by the release of the tension in the flexible roof portion 9 by the preceding action of raising the levers 13. Having released the front edge the roof portion 9 will be in the position shown by chain lines in FIG. 2.

Next the flexible roof portion 9 is rolled up on itself in the direction of the arrow F₃ in FIG. 2. The roof portion 9 when thus rolled up is placed in the cupped receptacle 18 of the roll bar 8, as shown in FIG. 3. The stretcher levers 13 are finally returned to their lowered positions, bringing the catch elements 16 into engagement with the locking devices 17. The rolled-up roof portion 9 is then entirely concealed and protected by the transverse panel 12, which acts as a cover for the said receptacle 18.

In the variant illustrated in FIGS. 4 and 5 the transverse panel 12 is omitted and the rear edge of the flexible roof portion 9 is connected directly to the cross piece 15 which extends between the free ends of the two stretcher levers 13. In this variant the cupped receptacle 18 is covered by a separate hinged cover 19 articulated to the rear edge of the transverse section 7 of the roll bar 8. The cover 19 has at its front edge a downwardly projecting folded lip 19a which in the closed position of the cover, shown in FIG. 5, comes into contact with the crosspiece 15.

In the variant illustrated in FIG. 6, the front edge of the flexible roof portion 9 is rolled around a cylindrical rod 20 so as to form an enlarged bead adapted to engage by transverse sliding into a corresponding seating formed between the front cross member 3 and a section 33 connected to the rear of the said cross member. This front anchorage is possible only where the rear end of the flexible roof portion 9 can be disengaged from the stretcher levers 13. A device suitable for this purpose is shown in FIGS. 7 and 8.

In FIGS. 7 and 8 the rear edge of the flexible roof portion 9 has an enlarged transverse head 21 similar to that of the front edge (FIG. 6). To each of the stretcher levers 13 there is articulated at 22 an auxiliary lever 23, the two auxiliary levers 23 being interconnected at their free ends by a crossbar 24.

By moving the auxiliary levers 23 upwards relative to the levers 13, it is possible to introduce the rear edge bead 21 of the flexible roof portion 9 between the crosspiece 15 and the crossbar 24, as illustrated in FIG. 7. The auxiliary levers 23 are then returned to alignment with the stretcher levers 13, and the levers 13 are lowered towards the stringers 5, 6 as shown in FIG. 8, to place the flexible roof portion 9 under tension, the rear edge bead 21 being trapped between the crosspiece 15 and the crossbar 24.

In order to disengage the rear edge of the flexible roof portion 9 from the levers 13 the reverse of the above described procedure is used.

In the variant illustrated in FIG. 9 the rear edge bead 21 of the flexible roof portion 9 engages by crosswise sliding movement in a channel section bar 25 which interconnects the free ends of the two stretcher levers 13 and replaces the crosspiece 15 of the previously described embodiments.

It will be appreciated that the details of construction of practical embodiments of the invention can be widely varied from the examples which have been illustrated and described without departing from the scope of this invention.

What is claimed is:

1. In a motor vehicle with a sunshine roof of the kind having a roof opening, a flexible roof portion cooperating with said opening and having at its front edge means for connection to a cross member of the vehicle coachwork above the windscreen, and stretching means carried by the vehicle coachwork and connected to the rear edge of the roof portion to tension said roof portion when it closes the roof opening, the improvement which consists in that:

a. the roof opening with which said flexible roof portion cooperates is defined at the rear by a transverse portion of a roll bar forming part of the coachwork and laterally by two longitudinal stringers of the coachwork which inter-connect said cross member and the ends of said transverse portion of the roll bar.

b. the stretching means comprise two stretcher levers articulated to respective said stringers and a crosspiece interconnecting the free ends of said stretcher levers, said rear edge of the flexible roof portion being connectible to said crosspiece, and c. said transverse portion of the roll bar is formed with a cupped receptacle adapted to hold the flexible roof portion when the latter has been disengaged from the said cross member and rolled up.

2. Motor vehicle as defined in claim 1, including a movable cover is provided for closing said cupped receptacle.

3. Motor vehicle as defined in claim 2, wherein said movable cover comprises a transverse panel interconnecting the free ends of said two stretcher levers.

4. Motor vehicle as defined in claim 3, wherein the flexible roof portion has a rear end section affixed to the said transverse panel.

5. Motor vehicle according to claim 2, wherein said movable cover is articulated to the rear edge of said transverse portion of the roll bar.

6. Motor vehicle according to claim 1, wherein the rear edge of the flexible roof portion is releasably connected to the crosspiece carried by the free ends of the stretcher levers.

7. Motor vehicle according to claim 6, wherein said crosspiece interconnecting the free ends of the stretcher levers has a channel section and the rear edge of the flexible roof portion is furnished with an enlarged portion adapted to engage slidingly in said channel section crosspiece.

8. Motor vehicle according to claim 6, including a pair of auxiliary levers articulated to the said stretcher levers and a crossbar interconnecting the free ends of the said auxiliary levers, and wherein the rear edge of the flexible roof portion is furnished with an enlarged portion adapted to engage between said crosspiece inter-connecting the free ends of said stretcher levers and said crossbar.

\* \* \* \* \*